United States Patent
Stähle

[11] 3,833,102
[45] Sept. 3, 1974

[54] FLUID OPERATED AUTOMATIC WEAR TAKE-UP ADJUSTING DEVICE FOR ELECTROMAGNETIC, SPRING LOADED, FRICTION ENGAGING MECHANISM

[75] Inventor: Karl Stähle, Friedrichshafen, Germany

[73] Assignee: Zahnradfabrik Friedrichshafen AG, Friedrichshafen, Germany

[22] Filed: Dec. 18, 1972

[21] Appl. No.: 316,072

[30] Foreign Application Priority Data
Dec. 24, 1971   Germany............................ 2164542

[52] U.S. Cl............. 192/111 A, 192/90, 192/84 B, 192/70.25, 188/196 A, 188/171, 188/71.8
[51] Int. Cl........................ F16d 27/00, F16d 29/00
[58] Field of Search..... 192/70.25, 84 B, 90, 111 A; 188/71.8, 171, 196 A

[56] References Cited
UNITED STATES PATENTS

| | | | |
|---|---|---|---|
| 2,292,704 | 8/1942 | Lillquist............................ | 192/90 X |
| 2,945,573 | 7/1960 | Wiedmann........................ | 192/84 B |
| 3,331,481 | 7/1967 | Wrensch.............................. | 192/90 |
| 3,548,989 | 12/1970 | Root................................ | 192/111 A |
| 3,744,609 | 7/1973 | Miller............................... | 192/111 A |

FOREIGN PATENTS OR APPLICATIONS

| | | | |
|---|---|---|---|
| 532,520 | 2/1958 | Belgium............................ | 192/90 |
| 1,146,690 | 11/1957 | France.............................. | 192/90 |

*Primary Examiner*—Samuel Scott
*Assistant Examiner*—Lance W. Chandler

[57] ABSTRACT

Displacement of the magnetic body of a spring engaged, friction brake or clutch, is automatically adjusted for releasing operation by a valve controlled fluid pressure resisting stop device. Movement of a spring loaded armature in response to wear of a friction disc engaged therewith, displaces a piston confining a pressurized body of fluid by opening of a valve from which a valve rod extends to form a limit stop engaged by the magnetic body that is displaced by the armature in one direction.

11 Claims, 1 Drawing Figure

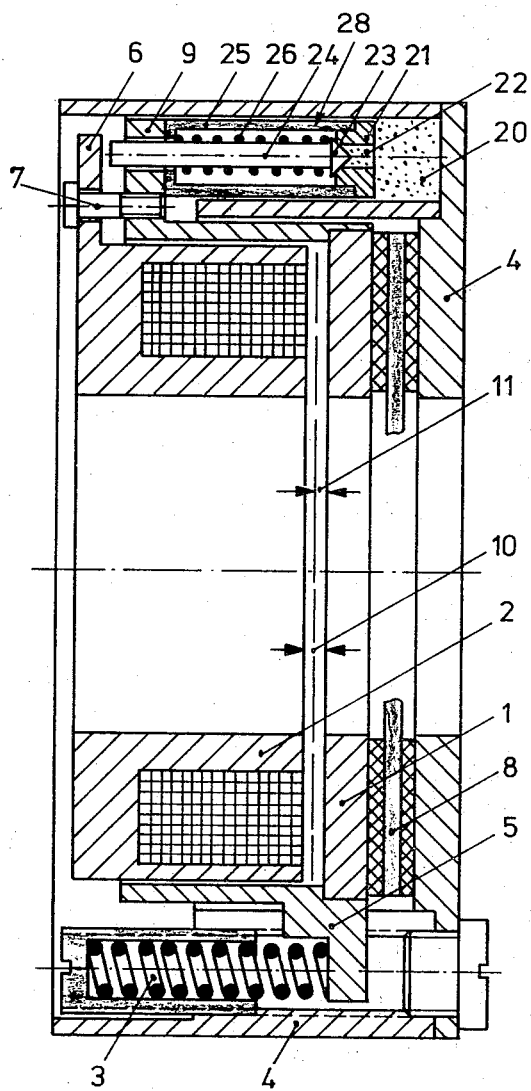

FLUID OPERATED AUTOMATIC WEAR TAKE-UP ADJUSTING DEVICE FOR ELECTROMAGNETIC, SPRING LOADED, FRICTION ENGAGING MECHANISM

This invention relates to the automatic adjustment of flux gap spacing in an electromagnetic spring biased brake or clutch mechanism.

In a friction engaging mechanism wherein releasing operation is effected by energization of a magnetic body to displace an armature against the bias of springs, the flux gap between the armature and the magnetic body tends to increase as the friction surfaces wear. According to one proposed arrangement for dealing with this problem, the maximum flux gap spacing is limited by a mechanical coupling through which the magnetic body is displaced in one direction under the bias of the armature springs to take up wear. The magnetic body is displaceable in the same direction toward the armature during releasing operation to a position spaced from the armature by an amount maintained constant by means of an automatic adjusting device.

In accordance with the present invention, the foregoing automatic adjusting device includes a pressure chamber within which a fluent medium is entrapped by a piston assembly operatively connected to the armature. Any movement of the armature from its normally engaged position to take up wear, displaces the piston assembly to reduce the volume of pressure medium entrapped, by opening of a pressure responsive valve mounted by the piston assembly. A valve rod connected to the valve projects from the piston assembly and forms a limit stop engaged by the magnetic body in its adjusted position to prevent opening of the valve during releasing operation of the friction engaging mechanism.

The invention will be described with respect to one exemplary embodiment shown in the drawing, which illustrates a longitudinal section view of a spring loaded, brake mechanism. It will, however, be appreciated that the invention is similarly applicable to a spring engaged clutch mechanism.

Referring now to the drawing in detail, the basic brake mechanism includes an armature disc 1 confronting the flux emitting face on the body 2 of an electromagnetic device that is operatively positioned within a cylindrical housing 4. A plurality of circumferentially spaced springs 3 peripherally mounted by the housing, axially bias the armature disc in one direction toward a backing disc 4' secured to the housing to thereby engage a friction disc assembly 8. The brake is released by energization of the electromagnetic device to initially displace the magnetic body to an adjusted position determined by a plurality of automatic adjusting devices 28 peripherally mounted by the housing, and subsequently displace the armature disc into engagement with the flux emitting face of the magnetic body against the bias of the springs 3. Mechanical couplings in the form of bolts 7 are threadedly connected to radial formations 9 on a guide casing 5 connected to the armature disc. The bolts slidably extend through openings in radial extensions 6 of the body 2 to guide axial movement of the body toward the armature as well as to limit the maximum flux gap spacing 10 between the body and the armature disc.

The flux gap spacing 11 between the body 2 in its adjusted position and the armature disc is maintained constant despite wear of the friction disc assembly 8, by means of the automatic adjusting devices 28, as aforementioned. Each device 28 comprises a pressure chamber 20 filled with a viscous fluent material confined under pressure by a piston assembly which includes a piston element 21 having an opening 22 formed therein and a tubular casing 25 connected to the piston element. A conical valve element 23 mounted within the piston assembly is seated in the opening 22 and has a valve rod 24 extending therefrom through the casing 25 which encloses a spring 26 to bias the valve element 23 to a closed position. The casing 25 is engaged by the radial formation 9 of the guide casing having an opening through which the valve rod slidably extends toward the radial extension 6 of the magnetic body.

For brake releasing operation, the electromagnetic device is energized causing the magnetic body 2 to be initially displaced toward the armature disc 1 in view of the resistance to movement exerted on the armature disc by springs 3. This initial movement of the body 2 is limited by engagement of extension 6 with the valve rod 24 after which the armature disc is displaced by the flux gap distance 11 into contact with the flux emitting face of the body 2 compressing the springs 3. The radial formaton 9 will then be axially spaced from the piston casing 25 by the same distance 11. This distance 11 is maintained constant, as aforementioned by wear take-up adjustment of the devices 28.

When the electromagnetic device is deenergized, the springs 3 displace the armature disc 1 through guide casing 5 into engagement with the friction disc assembly 8. If any wear occurs in the friction disc assembly, a corresponding axial pressure of formation 9 of the guide casing 5 is transmitted through casing 25 to the piston element 21. The fluid in chamber 20 is accordingly pressurized to open valve element 23 against the bias of spring 26 to permit sufficient outflow of fluid and retraction of the limit stop rod 24 with the piston assembly so that the armature disc may firmly engage the friction disc assembly or take up the wear. The magnetic body 2 will trail or follows such wear take-up movement of the armature disc in view of the bolt coupling connections 7.

I claim:

1. In combination with an electromagnetic torgue control engaging mechanism having a backing member and a friction member engageable therewith, a spring-biased armature movably mounted by the backing member and engageable with the friction member, a magnetic body operatively connected to the armature for movement relative thereto, and automatic wear take-up means operatively mounted by the backing member for adjusting the position of the magnetic body relative to the armature in response to wear of the friction member including pressurized valve control means engageable by the magnetic body.

2. The combination of claim 1 including means for limiting relative displacement between the armature and the magnetic body.

3. The combination of claim 2 wherein the pressurized valve control means includes pressure chamber means connected to the backing member enclosing a pressure medium, piston means for confining the pressure medium within the chamber means under pressure, valve means mounted by the piston means for releasing a limited quantity of said pressure medium in response to displacement of the piston means by the armature, and limit stop means connected to the valve means and engageable by the magnetic body for preventing opening of the valve means when the magnetic body is displaced to the adjusted position thereof.

4. The combination of claim 3 wherein said limit stop means comprises a valve rod connected to the valve means and projecting from the piston means into engagement with the magnetic body.

5. The combination of claim 4 wherein said pressure medium is viscous fluent material.

6. The combination of claim 1 wherein the pressurized valve control means includes pressure chamber means enclosing a pressure medium, piston means for confining the pressure medium within the chamber means under pressure, valve means mounted by the piston means for releasing a limited quantity of said pressure medium in response to displacement of the piston means by the armature, and limit stop means connected to the valve means and engageable by the magnetic body for preventing opening of the valve means when the magnetic body is displaced to the adjusted position thereof.

7. The combination of claim 6 wherein said limit stop means comprises a valve rod connected to the valve means and projecting from the piston means into engagement with the magnetic body.

8. The combination of claim 7 wherein said pressure medium is viscous fluent material.

9. The combination of claim 6 wherein said pressure medium is viscous fluent material.

10. In combination with a friction engaging mechanism having a housing, a friction member, an armature movably mounted within the housing, spring means mounted in the housing and engageable with the armature for displacing the friction member into contact with the housing, and magnetic release means for disengaging the armature from the friction member, the improvement including mechanical coupling means connected to the armature for limiting relative movement between the armature and the magnetic release means to positions spaced apart by a maximum flux gap, limit stop means mounted by the housing and engageable by the magnetic means for limiting movement thereof toward the armature to an adjusted position, and automatic wear take-up means operatively connected to the limit stop means for permitting limited displacement thereof by the magnetic means under the bias of the spring means in response to wear of the friction member to maintain a flux gap of constant spacing in the adjusted position of the magnetic means through which the armature is displaced into engagement with the magnetic means.

11. The combination of claim 10 wherein said automatic take-up means includes a fluid entrapping chamber, a piston sealing the chamber, and valve means connected to the limit stop means and the piston for releasing fluid from the chamber in response to said limited displacement of the limit stop means.

* * * * *